Patented Mar. 2, 1943

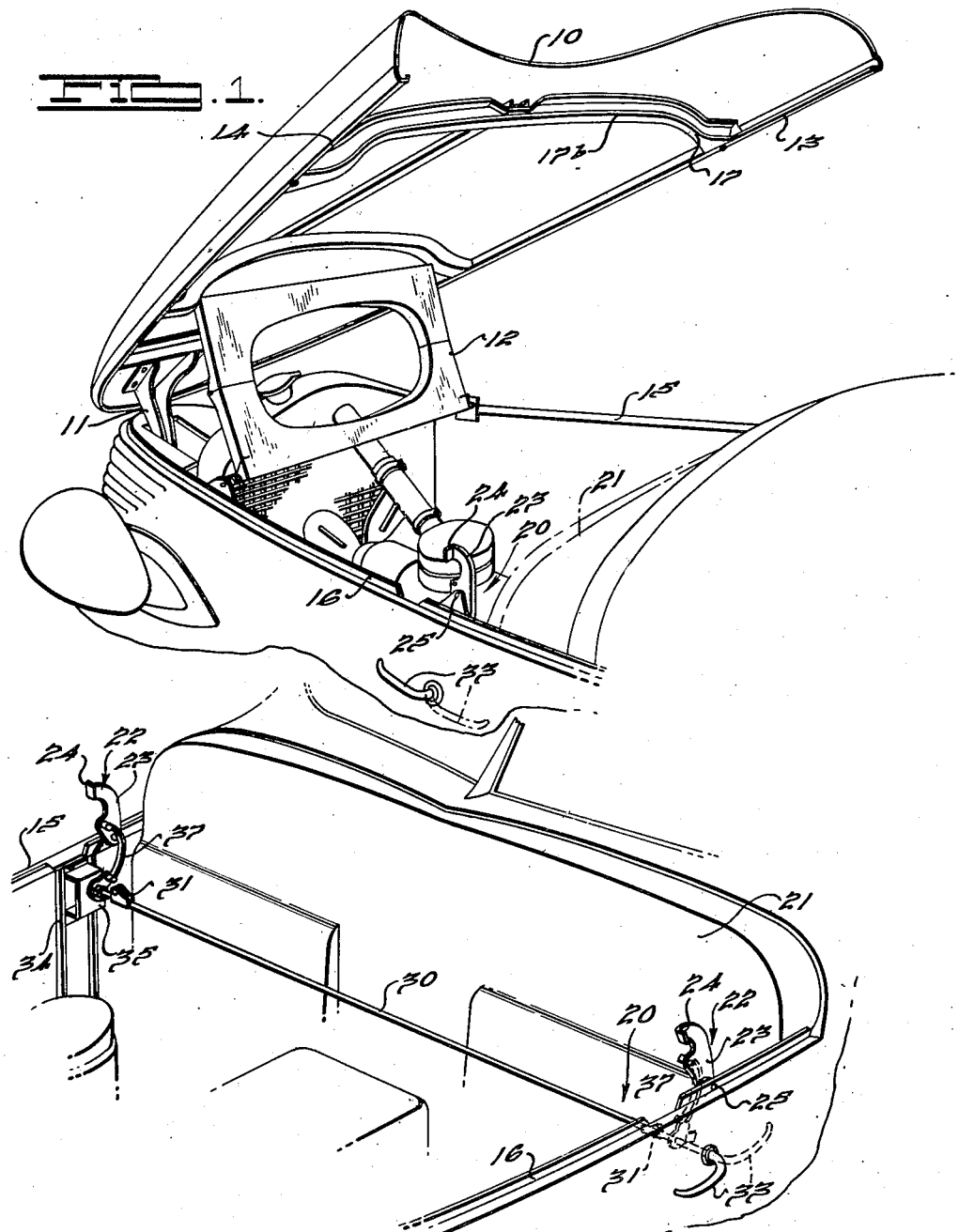

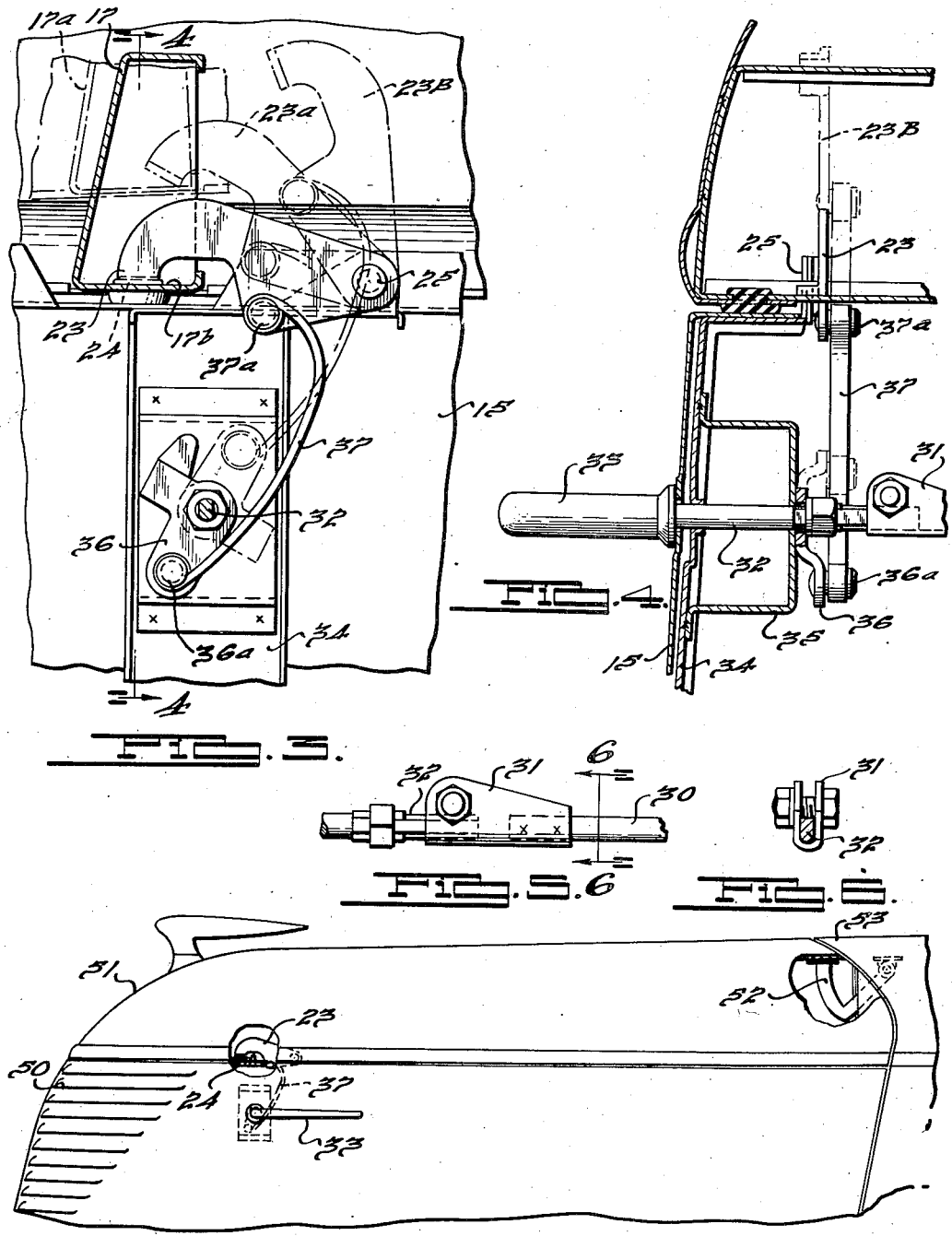

2,312,578

UNITED STATES PATENT OFFICE 2,312,578

HOOD LOCKING MECHANISM

Homer Murray Northrup and James W. Greig, Grosse Pointe Park, Mich., assignors to Hudson Motor Car Company, Detroit, Mich., a corporation of Michigan Application January 28, 1938, Serial No. 187,346

22 Claims. (Cl. 292—48)

The present invention relates to improvements in motor vehicle construction and particularly to improvements in a hood or bonnet locking mechanism.

It is a principal object of the present invention to provide a hood or bonnet locking mechanism, particularly but not exclusively adapted to lock a movable hood or bonnet securely in a closed position and which in one locking operation simultaneously locks the opposed sides of the hood or bonnet.

It is a further object of the present invention to provide a hood or bonnet locking mechanism, particularly but not exclusively adapted to lock a movable hood or bonnet and which may be operated to lock or unlock the hood or bonnet from either side of the vehicle.

Another object of the present invention is to provide a hood or bonnet locking mechanism, particularly but not exclusively adapted to lock a movable hood or bonnet and in which a rotatable actuating rod extends through and is secured to the side panels forming a part of the hood and acts as a lateral cross brace or stay.

A further object of the present invention is to provide a hood or bonnet locking mechanism, particularly but not exclusively adapted to lock a movable hood or bonnet and in which the locking members are resiliently held in locking position by spring elements which maintain the structure in a locked non-rattling contact with the buffer members disposed between the hood or bonnet and the vehicle body.

Other objects of this invention will appear in the following description and appended claims, reference being had to the accompanying drawings forming a part of this specification wherein like reference characters designate corresponding parts in the several views.

Fig. 1 is a fragmentary view in perspective looking forward of a vehicle hood utilizing a locking mechanism of the present invention.

Fig. 2 is a fragmentary view in perspective looking rearward of the vehicle hood and showing the locking mechanism of the present invention.

Fig. 3 is a side elevation of a latch member of the present invention, showing in the solid line portion its position for locking the hood bonnet in closed position and showing in the dotted line portions the position of the parts at an intermediate stage and in the unlocked position.

Fig. 4 is a section taken substantially on the line 4—4 of Fig. 3 in the direction of the arrows.

Fig. 5 is an elevation of a connecting clamp member.

Fig. 6 is a section taken substantially on the line 6—6 of Fig. 5 in the direction of the arrows.

Fig. 7 is a fragmentary elevation with parts broken away of a hood structure of conventional design and showing a use of the hood latching mechanism of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings, Fig. 1 shows the hood latching mechanism applied to a hood constructed in accordance with the disclosures in the co-pending application of James W. Greig, Serial No. 185,094 now U. S. Letters Patent No. 2,235,496, dated March 18, 1941. No claim is herein made to the particular features of such hood construction and assembly. Such a construction may employ a unitary bonnet member 10, hinged at its forward end as at 11. The bonnet 10 is shown in Fig. 1 in its raised position. When in the closed position, the support 12 is folded and the flanged edges 13 and 14 of the bonnet contact with the upper flanged edges of the side panels 15 and 16, which form the sides of the hood.

The bonnet locking mechanism of the present invention when used with such a hood construction, is positioned as indicated generally by the numeral 20, at a point adjacent the rear end of the bonnet 10 and forward of the cowl 21 of the vehicle body. The cross brace 17 secured to the bonnet 10 and extending transversely of the hood provides a rigid rearwardly facing channel having its lower flange 17b in position to provide a bracket member to be engaged by the locking mechanism of the present invention (Fig. 3).

The invention may also be applied to motor vehicles in which the conventional type of so-called "alligator" hood is employed as shown, for example, in Fig. 7. As there shown the hood is formed of a side panel and grille portion 50, which is enclosed at the top by a bonnet 51 which is connected by the hinge 52 to the cowl portion 53 of the vehicle body. In the instance here shown, the hood latching mechanism of the present invention is applied at a point adjacent the forward end of the hood and the arms 23 of the locking members coact with a transverse brace connecting opposite sides of the hood bonnet 51 at a point adjacent its forward end. With reference to the embodiments of Figs. 1 and 7, it will be understood that other means, such as inwardly extending portions or brackets, may be provided on the bonnet positioned for engagement by the latch arms 23.

The bonnet locking mechanism of the present invention, whether located adjacent the rear edge of the bonnet, as shown in Figs. 1 and 2, or adjacent the forward part of the bonnet, as shown in Fig. 7, comprises a pair of locking members generally indicated at 22 disposed one at each side of the hood assembly and located at points adjacent the upper flanged edges of the side panels 15 and 16. Each of the locking members, as shown in Figs. 3 and 4, consists of a hooked arm 23 having a lateral flange or other bearing portion 24 for contacting the flange 17b of the cross brace 17 when the bonnet 10 is in the closed position, as shown in the solid line view, or contacting this cross bar 17 when the bonnet 10 approaches the closed position as shown in the dotted line view (Fig. 3) wherein the respective parts in the intermediate position are indicated by the numerals 17a and 23a. When the bonnet 10 is in the raised position, as shown in Figs. 1 and 2, the hooked arm members 23 occupy the positions indicated by the dotted line view 23B (Fig. 3), which is also the position of the parts as shown in the full line views of Figs. 1 and 2. Each hooked arm member 23 is mounted, as at 25, on a pivot having its center on a line extending through a point either substantially on a line extending from the point of contact between the portion 24 of the arm 23 and the coacting surface of the flange 17b of the cross member 17, or, preferably, slightly forward of this line. In moving from the locking to the unlocking positions, as indicated by the full line view of the arm 23 and the dotted line view of the arm 23B, the arm 23 describes an arc of approximately 90° about its pivotal mounting, moving from a substantially horizontal to a substantially vertical position. The parts are preferably so designed that the arc described by this pivotal movement of the arms 23 intersects the line of the cross member 17 at a point approximately 30° removed from their closed position, that is, approximately 30° from the horizontal position of the arms 23.

It will be seen, therefore, that a latching contact between the arms 23 and the cross member 17 is established prior to the complete closure of the bonnet 10. This prior latching is a desirable feature of the present invention in that it permits variation in the vertical position of one side of the bonnet 10 relative to the other side during the closing operation, yet assures within reasonable limits a locking engagement at both sides of the bonnet 10.

The arms 23 on the opposed sides of the hood are connected by a cross rod 30, which rod secures simultaneous movement for locking or unlocking the bonnet 10. The cross rod 30 is provided with clamps 31 at its opposite ends which engage the flattened ends of the stub shafts 32 to which the operating handles 33 are connected (Figs. 5 and 6).

While various types of constructions may be employed, the construction shown by way of example in Figs. 3 and 4 is satisfactory to provide a support for the entire locking sub-assembly. As there shown, a bracket member 34 is secured to the side panel and carries an extension bracket 35. The stub shaft 32 is journaled in aligned openings provided in the side panel and the brackets 34 and 35. One end of the shaft 32 extends outside of the side panel and the operating handle 33 is secured thereto. Since a locking assembly is provided on each side of the hood, it will be apparent that an operating handle 33 is accessible from each side of the vehicle. The shaft 32 is designed to be rotated through 180° of movement of the handles 33. This movement of the shaft is transmitted to each locking arm 23 by a cross head or crank arm 36 mounted on the shaft 32 and a spring link member 37 pivotally connected at one end to a pin or stud 36a on the outer end of one of the crank arms 36 and at the other end to a pin or stud 37a secured to one of the arms 23 at a point intermediate the pivot 25 and the working end 24 thereof.

The operation of the latch mechanism is as follows:

The locking members 23 are moved into or out of locking engagement by actuation of the handle members 33 which are placed outside of the side panels of the hood, one on each side of the vehicle. The handles 33 are arranged to move throughout an arc of 180° in moving the members 23 from the fully unlocked position, as shown in Figs. 1 and 2, to the locked position shown in Figs. 3 and 4. The turning movement of the handles 33 is transmitted through the shafts 32 to the cross heads or crank arms 36. The arms 36, being pivotally connected to the spring links 37, cause bodily endwise movement of the spring links and the thrust of these links in turn causes pivoting or swinging movement of the members 23 about the pivots 25.

The use of the spring link members 37 permits a flexibility of operation of the latching members as illustrated by way of example in the dotted line views of Fig. 3. As there shown, the members 23 in the dotted line position 23a may contact the cross member shown in the dotted line position 17a at a point prior to the complete closure of the bonnet. Due to the flexibility of the spring link members 37 this condition may exist at points adjacent one of the locking members, while the other locking member may be in the fully closed position. The difference in the positions of the two members relative to the rotation of the cross shaft is thus accommodated by distortion of one of the spring links 37. The spring links 37 are of such a design and so selected as to cause the springs to exert a substantial pressure on the cross member 17 either to bring it from the dotted line position 17a to the closed position 17 or to hold the member securely in the closed position as shown in the solid line view of Fig. 3. In a preferred embodiment, for example, two of the spring link members 37 may exert a combined force of 200 lbs. in holding the bonnet in the closed position, which force is, of course, increased for purposes of bringing the bonnet to the closed position by the distortion of the spring as shown when the member 23 occupies the dotted line position 23a wherein the bonnet is not completely closed. In the event that the bonnet cannot be fully closed, the spring tension is such that the bonnet may be maintained in the partially closed position until the forces exerted on the hood, as, for example, by air pressures due to motion of the vehicle, exceed the force exerted by the springs.

As hereinbefore stated an important feature of the invention resides in the provision of a locking mechanism which may be operated from either side of the hood. Thus, when the cross shaft 30 is partially rotated by handle 33 at either side of the vehicle, both spring link members 37 are simultaneously loaded and the effort exerted thereby is utilized to lock the bonnet closed at two points. As an important aspect of the invention the cross shaft 30 is so constructed as to have a high torsional resistance factor sufficient to overcome the load of the tension spring members 37. Thus, since the torsional resistance of shaft 30 is sufficient to overcome the combined resistance effort of the springs 37, it will be seen that both locking members 23 will be moved positively into locking positions. The spring of the rod, as heretofore in connection with certain types of dual hood locks mounted at the same side of the hood, is not relied upon to control the locking members. In the present instance, however, the shaft 30 is relieved of any torsional stresses as soon as the handle is released and the locking members applied.

The construction here shown is also desirable in that manufacturing variations within reasonable tolerances may be permitted between the two sides of the hood structure without impairing the operation of the latching mechanism. Any such variations in distance between the side panel assemblies is accommodated within reasonable limits by the connecting rod and clamp assemblies previously described.

I claim:

1. In a motor vehicle hood construction having fixed side panels and a bonnet movable relative thereto, a bonnet locking mechanism comprising bonnet locking latch members pivotally connected on opposed sides of the said side members and arranged to contact opposed edges of the bonnet when in closed position, shaft members extending through said side panels, spring link members connected with said shaft members and said latch members to provide a resilient connection between each of said shaft members and the adjacent latch member, a rotatable cross shaft extending transversely of the hood and connected with said shaft members, whereby rotation of either of said shaft members moves both of said latch members into or out of locking engagement with said bonnet.

2. A locking mechanism for a motor vehicle hood construction having a movable top panel and comprising latch members disposed on opposite sides of the hood and arranged to engage the underside of the top panel and maintain it in closed position, and means for simultaneously moving said latch members into or out of locking engagement with said top panel and comprising a rotatable cross shaft and resilient means permitting relative movement of the latch members.

3. A locking mechanism for a motor vehicle hood construction having a movable top panel and comprising latch members disposed on opposite sides of the hood and arranged to engage the edges of the top panel and maintain it in closed position, and means for simultaneously moving said latch members into or out of locking engagement with said top panel and comprising a rotatable cross shaft having fixed arms secured thereto for rotation therewith, and spring links connecting said arms and said latch members for transmitting rotative movement of said shaft into pivotal movement of said latch members for locking and unlocking.

4. A locking mechanism particularly adapted for locking a top bonnet of a motor vehicle hood having fixed side panels forming a part of said hood, said locking mechanism comprising a rotatable cross shaft rotatable from either side of said hood, latch members adapted to lock opposite sides of said bonnet in closed position to said panels, and resilient connections between said shaft and said latch members whereby rotation of said shaft causes simultaneous movement of said latch members to effect locking or unlocking of said bonnet.

5. A locking mechanism particularly adapted for locking a top bonnet of a motor vehicle hood having fixed side panels forming a part of said hood, said locking mechanism comprising a rotatable cross shaft rotatable from either side of said hood, latch members adapted to lock opposite sides of said bonnet in closed position to said panels, arms fixed to said shaft and disposed adjacent said latch members and adapted to be rotated with said shaft, and spring link members between said arms and said latch members to provide resilient connections between said shaft and said latch members whereby rotation of said shaft causes a substantially simultaneous yielding movement of said latch members to effect locking or unlocking of said bonnet.

6. In a motor vehicle having a hood provided with a top bonnet pivoted at one end for upward and downward swinging movement and having a transverse brace member connecting opposite longitudinal edges thereof, a swinging latch member pivoted to a fixed portion of the hood, a rotatable handle shaft mounted on said hood and having a crank arm, and a resilient connection between said arm and latch member effective to swing said latch member into and out of engagement with said brace member upon turning said shaft.

7. In a motor vehicle having a hood provided with a top bonnet pivoted at one end for upward and downward swinging movement and having a transverse brace member connecting opposite longitudinal edges thereof, a swinging latch member pivoted to a fixed portion of the hood to swing about a substantially horizontal axis, a rotatable handle shaft mounted on said hood and having a crank arm, and a spring link connection between said arm and latch member effective to swing said latch member into and out of engagement with said brace member upon turning said shaft.

8. In a motor vehicle, a top bonnet pivoted at one end for swinging movement and provided with a fixed flange at its under side, a swinging latch member mounted on a fixed portion of the vehicle structure and having a working end engageable over said flange in different vertical positions thereof, and handle controlled actuating mechanism including yielding means for swinging said latch member.

9. In a motor vehicle, a top bonnet pivoted at one end for swinging movement and provided with a fixed flange at its under side, a swinging latch member mounted on a fixed portion of the vehicle structure to swing upward and downward about a transverse substantially horizontal axis and having a working end engageable over said flange in different vertical positions thereof, and handle controlled actuating mechanism including yielding means for swinging said latch member.

10. In a motor vehicle having a pivoted hood adapted to be raised and lowered, a pair of spaced movable locking members adapted to cooperate with the hood for locking the same, a rotatable shaft interconnecting said members and adapted to be rotated to simultaneously move said locking members into locking positions, and spring means between the shaft and locking members for maintaining the latter in locking positions and having a combined effort to resist rotation of said shaft less than the effective torsional resistance of the shaft.

11. In a motor vehicle hood construction having a bonnet movable relative thereto, a bonnet locking mechanism comprising a rotatable cross shaft extending transversely of the hood, upwardly and downwardly swinging bonnet locking members pivotally mounted adjacent opposed sides of the hood and arranged to contact the underside of the bonnet when in closed position and to exert downward pressure thereon when moved to locking position, and resilient connecting means between said shaft and said members whereby rotation of said shaft moves said members for locking or unlocking said bonnet.

12. A motor vehicle hood construction according to claim 11 comprising means for actuating said cross shaft from either end thereof.

13. A bonnet locking mechanism particularly adapted for use on motor vehicles, and comprising rotatable shaft members connected with each other transversely of the bonnet and each having a fixed arm secured thereto for rotation therewith, a latch member pivotally connected adjacent each of said rotatable shaft members and having an extending portion arranged to engage a portion of the bonnet, spring link members connecting said shaft members and said latch members whereby rotation of the said shaft members moves said latch members into or out of locking engagement with the bonnet member, and means for simultaneously rotating said shaft members from either side of the bonnet.

14. In a motor vehicle, a bonnet pivoted at its forward end to permit the rear end to be raised and lowered, a pair of transversely spaced movable locking devices adapted to cooperate with the underside of the rear movable end of the hood for locking the same, a rock shaft for simultaneously operating said devices, and a handle connected to the shaft for turning the same.

15. A structure according to claim 14 comprising spring means for permitting yieldable movement of one device relative to the other.

16. In a motor vehicle hood construction having a bonnet hinged at its forward end to permit the rear end to be raised and lowered, locking means cooperable with the rear end of the bonnet at the underside for locking the same when closed, means for supporting said locking means upon a fixed portion of the vehicle adjacent opposite longitudinal sides of the bonnet, and transverse brace means on the underside of the bonnet coacting with the locking means when the bonnet is locked and adapted to brace the bonnet substantially between the points of engagement of the locking means with the bonnet.

17. In a motor vehicle hood structure, a transversely arched bonnet hinged at its forward end to permit the rear end to be raised and lowered, a brace member extending transversely of the bonnet from side to side beneath and adjacent the rear end thereof, and locking devices underneath the bonnet cooperable with means on the brace member at opposite sides adjacent the ends of said brace member for drawing down said end of the bonnet and locking the same.

18. In a motor vehicle hood structure a transversely arched bonnet hinged at its forward end to permit the rear end to be raised and lowered, means for transversely stiffening the rear end of the bonnet, and locking means concealed beneath the hood and cooperable with means associated with said stiffening means at the underside of the bonnet for locking the same in lowered position.

19. In a motor vehicle hood structure a transversely arched bonnet hinged at its forward end to permit the rear end to be raised and lowered, means for transversely stiffening the rear end of the bonnet, and locking means concealed beneath the hood and cooperable with the rear end of the bonnet at the underside thereof for locking the same in lowered position, said locking means cooperating with means on said stiffening means for drawing down the bonnet tightly.

20. In a motor vehicle hood construction having a hinged bonnet adapted to be raised and lowered, locking devices cooperable with the bonnet at the underside thereof at transversely spaced points for locking the same, a common means for positively and simultaneously moving said devices into bonnet locking positions and including means permitting movement of one device relative to the other as the devices are thus moved to locking positions.

21. In a motor vehicle hood construction having a hinged bonnet adapted to be raised and lowered, locking devices cooperable with the bonnet at the underside thereof at transversely spaced points for locking the same, a common means for positively and simultaneously moving said devices into bonnet locking positions and including resilient means permitting movement of one device relative to the other as the devices are thus moved to locking positions.

22. In a motor vehicle hood construction having a hinged bonnet adapted to be raised and lowered, locking devices cooperable with the bonnet at the underside thereof at transversely spaced points for locking the same, and a common means shiftable in one direction for positively and resiliently shifting said devices into bonnet locking positions and also shiftable in the opposite direction for shifting said devices out of bonnet locking positions.

H. MURRAY NORTHRUP.
JAMES W. GREIG.